2 Sheets--Sheet 2.
J. KEYS & J. R. DeMIER.
Wheel-Plow.
No. 163,595. Patented May 25, 1875.
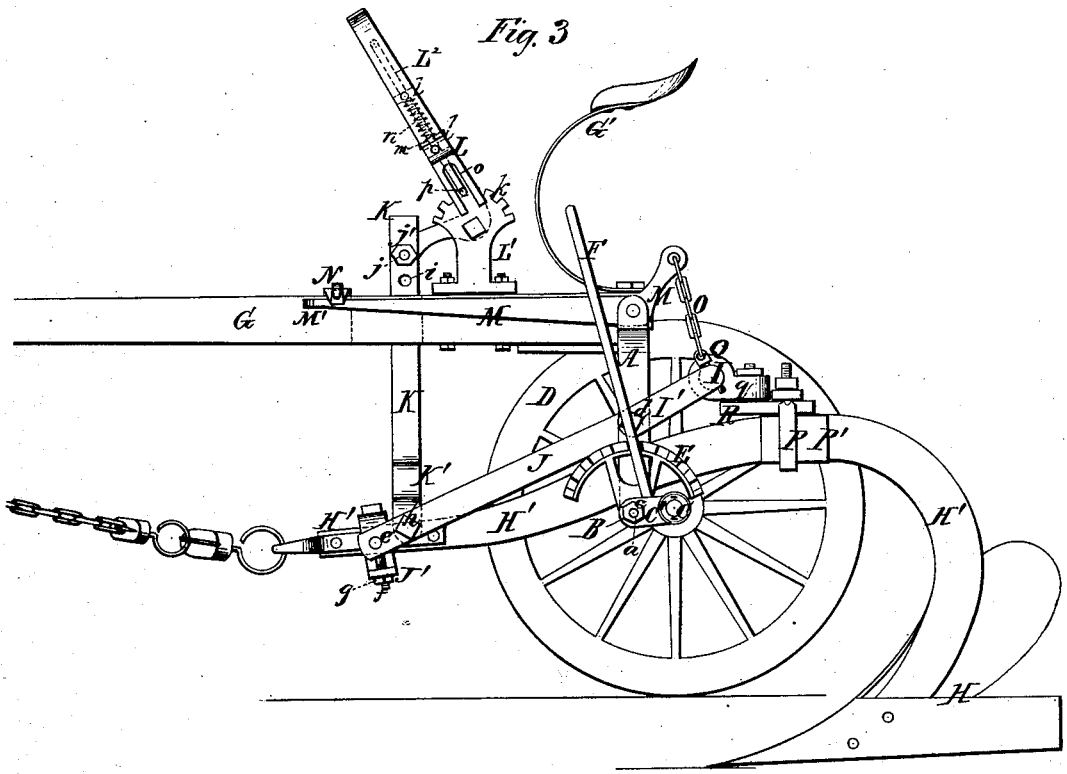
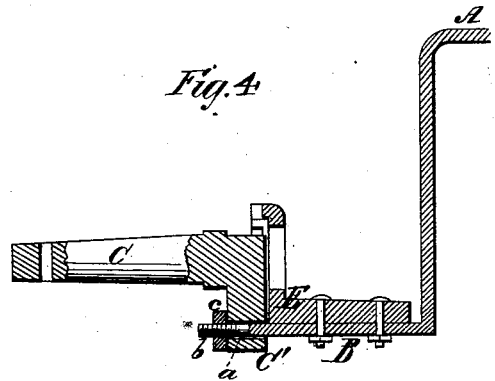
Witnesses. Inventors.
John Keys, and John R. DeMier.
by
Mason, Fenwick & Lawrence.
his Attorneys.
THE GRAPHIC CO. PHOTO-LITH. 39 & 41 PARK PLACE, N.Y.

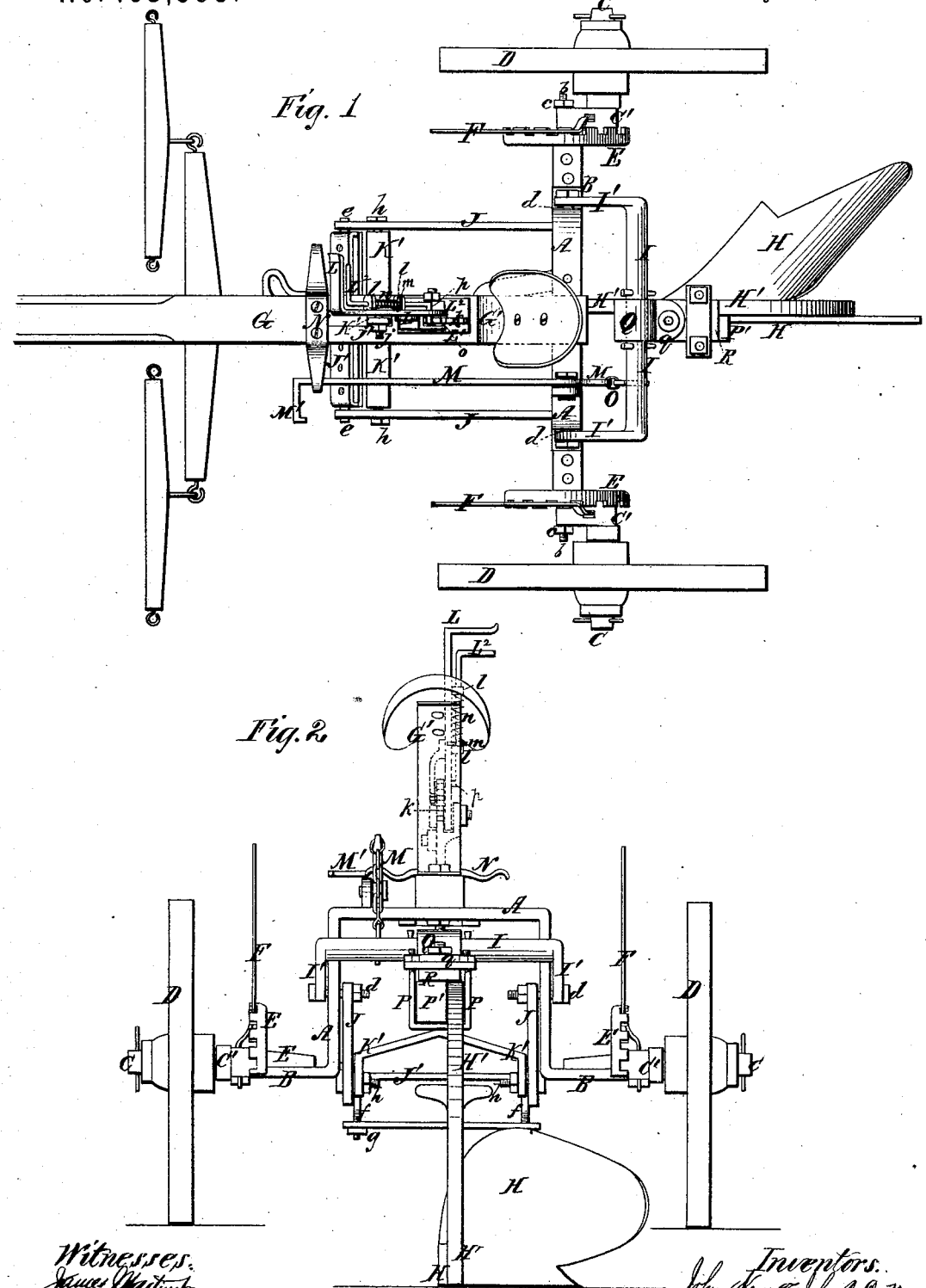

UNITED STATES PATENT OFFICE.

JOHN KEYS AND JOHN R. DE MIER, OF COULTERSVILLE, ILLINOIS.

IMPROVEMENT IN WHEEL-PLOWS.

Specification forming part of Letters Patent No. 163,595, dated May 25, 1875; application filed February 20, 1875.

*To all whom it may concern:*

Be it known that we, JOHN KEYS and JOHN R. DE MIER, of Coultersville, county of Randolph and State of Illinois, have invented a new and useful Improvement in Wheeled Plows; and we do hereby declare that the following is a full, clear, and exact description thereof, reference being had to the accompanying drawings making part of this specification, in which—

Figure 1 is a top view, Fig. 2 an end view, and Fig. 3 a side view, of our improved wheeled plow. Fig. 4 is a broken cross-section through the arched axle, short crank-axles, and sector-plate.

The nature of our invention consists in certain novel constructions and combinations of parts, as hereinafter described and specifically claimed.

To enable others skilled in the art to make and use our invention, we will proceed to describe it.

A is an arched supporting-axle, and B B arms on the ends of the same. These arms are terminated in reduced cylindrical spindles $a\ a$, which run out from shoulders and have screw-threads $b\ b$ cut upon their extreme ends, upon which nuts $c\ c$ are screwed. C C' are short crank-axles, upon which the traction-wheels D D are fitted so as to revolve. The arms C' of the axles are bored through cylindrically near their outer ends, and through the circular eyes thus formed the spindles $a$ of the axle A are passed before the nuts $c\ c$ are screwed upon them. E E are sector-plates, notched or toothed on their outer face near their periphery. These plates are bolted fast to the arms B B of the axle A. F F are hand-levers made fast to the arms C' of the short axles. These levers spring in a direction toward the wheels D D, and they spring into the notches of the sector-plates when not pressed upon by the hand, and thereby hold the short crank-axles C C' rigid with the axle A. By releasing one of the levers from the notches in its sector-plate the short crank-axle with the wheel thereon can be turned around so as to bring the arm C' horizontal while the arm of the crank-axle of the other wheel occupies a vertical position. Thus a ready adjustment of the wheeled plow on either side, for "side-hill," deep, shallow, or other styles of plowing can be effected at the will of the driver. Upon the center of the top of the arched axle a draft-tongue, G, is fastened by its rear end and extended forward the proper distance. On this beam, directly above the axle A, a spring-seat, G', for the driver, is constructed as shown. Under the arched axle and the tongue a plow, H, is attached to a beam, H', and is suspended by the following-described devices, viz: I is an angular bar in rear of the arched axle, and made with its transverse portion cylindrical and its arms or longitudinal portions I' I' flat. This bar is pivoted by its arms to the outer sides of this arched axle, as shown at $d\ d$, so as to vibrate up and down. J J are arms pivoted to the inner sides of the arched axle, so as to vibrate up and down in front of said axle. These arms are connected together at their front ends by a yoke, J', which is pivoted to the front ends of the bars, as shown at $e\ e$, so as to vibrate in a vertical plane upon said pivots. The top and bottom pieces of this yoke are perforated vertically from end to end, and the bottom piece is confined to the upper portion by means of screw-thread stems $f\ f$ and nuts $g\ g$, so that it can be set down or up, as occasion may require, or taken off to admit the plow-beam between it and the upper portion. K is a bifurcated bar or stirrup, connected by its lower arms K' K' and pivots $h\ h$ to the side bars J J, and passed upward through a slot in the tongue G, so as to extend some distance above the top of the tongue, as shown. This bar has its upper portion perforated, as at $i$, so as to be set for shallow or deep plowing, and this perforated portion is connected by a screw-pivot, $j$, and a nut, $j'$, to a bell-crank lever, L, which is pivoted to a slotted standard, L', fastened firmly on top of the tongue G. One jaw of this standard $L^1$ is enlarged in form of a sector, and in the periphery of the sector a series of radial notches, $k$, are cut. On the side of the bell-crank lever a stop-rod, $L^2$, is fitted to slide up and down and take into one or the other of the notches $k$, as occasion may require. This stop-rod is guided by lugs $l\ l$, between one of which and a pin, $m$, passed through the stop, a spiral spring, $n$, is placed by winding it upon the stop.

The lower end $p$ of the stop-rod, which forms the stop proper, is parallel with the pivot of the lever, and passes through an oblong slot, $o$, cut through the bell-crank lever, and fits in the notches $k$ when the hand is withdrawn from the finger-piece or upper end of the stop-rod. M is a bell-crank foot-lever pivoted to a lug on top of the arched axle and on one side of the tongue. This lever has its long or front arm bent out from the tongue at right angles, as at M′, so as to form a treadle for the foot, and its rear end is perforated, so as to have a chain hooked to it. The long arm of this lever catches under a transverse stop, N, which is on the tongue, and the short arm is connected, by a chain, O, to the rear angular bar I, as shown. To connect the plow H with its beam H′ to the suspending mechanism described, the front end of the beam is passed through the yoke J′, and a clip-iron, P, of U shape, with its clamping bar and nuts, is slipped upon the beam H to a position in rear of the bar I. A sleeve, Q, having a perforated lip, $q$, branching backward from it, is fitted upon the round part of the bar I, and confined thereon about in line with the tongue, by means of stop-pins, which permit it to turn, but not to slide. This sleeve is pivoted, by means of its lip and a pivot, to a plate, R, which is placed upon the top of the beam H′, and slipped under the clamping-piece of the clip-iron, and firmly clamped in position by screwing down the nuts of the clip-iron. A wedge-block, P′, is placed between the side of the beam and the clip and plate R.

By means of my invention a very simple wheeled plow is produced, and the necessary adjustments very readily and perfectly and conveniently effected. The short crank-axles turning on the spindles of the arch-axle, combined with the toothed sector and the spring-lever, afford a means for adjusting the plow and its supports without turning the arched axle on its spindles. The sleeve, fitted to turn on the vibrating bar I, and connected to the plate under the clip by a pivot, permits the point of the plow to be raised and lowered. It also permits the plow with its beam to be turned to the right or left more or less, and it also permits the plow to move in a vertical plane in case the front end of its beam should move up or down. The vibrating bar I and foot-lever and chain afford a means by which the driver can raise the plow out of operation whenever desirable, and while this is so the plow is suspended at the rear upon yielding supports. The perforated yoke confines the front end of the plow-beam from a too great up-and-down motion, and yet permits of it moving in a vertical plane as it turns on its pivots; also, of being moved to any desired point either right or left, in which positions, by inserting pins through the upper and lower portions of the yoke, it will be held until a new adjustment is made. The pivoted side bars, forked stirrup, bell-crank lever, sector, and spring-stop afford a very convenient means for throwing up the point of the plow, or allowing it to pitch downward, as occasion may require.

All the adjustments mentioned can be made by the driver while riding upon the plow, and sitting in the seat.

What we claim is—

1. The arched axle A, constructed with the spindle $a\ b$, in combination with the short crank-axles C, confined loosely thereon by nuts $c$, in the manner and for the purpose herein described.

2. The side bars J, pivoted to the sides of the arched axle, and connected at their front ends by a pivoted yoke, J′, in combination with the bar K, bell-crank lever L, and a suitable stop device, $L^2$, substantially as and for the purpose described.

3. The perforated swiveling yoke K′ on the pivoted side bars J J, in combination with the turning sleeve Q $q$ on the vibrating bar I, whereby the front and rear of the beam are supported and allowed movements in a vertical plane.

4. The combination, with the arched axle A, tongue G, and plow H H′, of the rear and front suspending supports I J J′ K and the levers L and M, substantially in the manner and for the purpose described.

JOHN KEYS.
JOHN RICHARD DE MIER.

Witnesses:
C. J. CHILDS,
MILTON C. McDANIEL.